UNITED STATES PATENT OFFICE.

FRANK R. ELDRED, FRANCIS E. BIBBINS, AND RAY N. REED, OF INDIANAPOLIS, INDIANA, ASSIGNORS TO THE ELI LILLY AND COMPANY, OF INDIANAPOLIS, INDIANA, A CORPORATION OF INDIANA.

PROCESS OF PREPARING COCA EXTRACTS.

1,235,450. Specification of Letters Patent. Patented July 31, 1917.

No Drawing. Application filed February 5, 1917. Serial No. 146,650.

*To all whom it may concern:*

Be it known that we, FRANK R. ELDRED, FRANCIS E. BIBBINS, citizens of the United States, residing at Indianapolis, Marion county, and State of Indiana, and RAY N. REED, a citizen of the United States, residing at Indianapolis, Marion county, and State of Indiana, have invented and discovered certain new and useful Improvements in Processes of Preparing Coca Extracts, of which the following is a specification.

Our invention relates to processes of preparing coca extracts. It has reference to modifications in the process set forth in our application, Serial No. 136,309, filed December 11th, 1916, for improvements in coca extracts and processes of producing the same.

The object of our present invention is to provide a cheaper and quicker method of obtaining the extract, which extract as in the invention set forth in the previous case is one which is not only free from cocain, but also from the other alkaloidal bases present in coca, which bases are principally ecgonin and benzoyl ecgonin.

According to our present invention, the coca leaves in their natural state are first subjected to steam distillation, in which step the distillate produced will carry with it most of the aromatic constituents of the leaves. This distillate is led off and is to be added to the extract after subsequent treatment of the leaves when it is desired to produce a product in which the original aromatic properties of the coca leaves are preserved. The leaves are then extracted with water, preferably by boiling, in order to increase the rapidity of extraction, and the aqueous extract thereof drained off. After this boiling step the leaves are then subjected to an expressing action to press out the remaining liquor therein, which is then added to the aqueous extract obtained by the boiling step. The complete aqueous extract is then concentrated, preferably by evaporation, and preferably to a dry state, and this concentrate is ground in a mill with successive portions of alcohol. This treatment by alcohol serves to remove most of the cocain and all of the other coca bases, which are primarily ecgonin and benzoyl ecgonin. Instead of evaporating the extract completely to dryness, the same may be merely concentrated to a semi-liquid or viscous condition and then treated with the alcohol.

The alcohol is then removed from the residue and the latter is dissolved in water. This solution is then treated with one or more portions of an adsorbing agent. For example, and preferably, hydrated aluminum or other natural earth silicate, such as fullers' earth, is employed, which removes all of the cocain not previously removed by the alcohol. The solution is then filtered off from the adsorbing agent and is then preferably concentrated. This step of concentration may be obtained by evaporation. It is not essential to the production of the extract but is preferably used in order to obtain the extract in more concentrated form.

Then the distillate from the steam distillation constituting the first step of the process and which distillate carries most of the aromatic constituents of the extract, is added to the concentrate. Of course, this final step of adding the original distillate may be dispensed with when it is not desired to produce a product possessing the aromatic properties originally present in the plant. The final product is a liquid extract free from cocain and the other alkaloids present in coca. This extract is employed as the basis for a beverage but may possibly have other uses.

The order of the steps of the process above defined may be changed without departing from our invention. Thus, instead of removing the ecgonin and benzoyl ecgonin by the use of the alcohol or other solvent, the cocain may first be completely removed by the use of the fullers' earth or other adsorbing agent and then the step of removing the ecgonin and benzoyl ecgonin employed.

It is also evident that the step of removing the ecgonin and benzoyl ecgonin by the solvents may be employed in combination with some other specific cocain removing medium than the adsorbing agent. For instance, chloroform or benzoyl, which are well known solvents for cocain, might be employed in lieu of the fullers' earth or similar adsorbing means in such broad combination.

Having thus described our invention, what we claim is:

1. The process of preparing an extract of coca leaves which consists in steam distilling the leaves, extracting the leaves with a solvent, treating the concentrated extract with solvents to remove the ecgonin and benzoyl ecgonin and treating the remaining portion of the extract with a cocain removing agent.

2. The process of preparing an extract of coca leaves which consists in steam distilling the leaves, extracting the leaves with water, concentrating the aqueous solution, treating the concentrated extract with solvents to remove the ecgonin and benzoyl ecgonin and treating the remaining portion of the extract with a cocain removing agent.

3. The process of preparing an extract of coca leaves which consists in boiling the leaves in water, concentrating the aqueous extract and then treating the concentrate with solvents, to remove the ecgonin and benzoyl ecgonin, and also with a cocain removing agent.

4. The process of preparing an extract of coca leaves which consists in subjecting the leaves to steam distillation, then boiling the leaves, draining off the aqueous extract, concentrating the solution, treating the concentrated extract with solvents to remove the ecgonin and benzoyl ecgonin and also treating the extract with a cocain removing agent.

5. The process of preparing an extract of coca leaves which consists in boiling the leaves in water, drawing off the aqueous extract, expressing the leaves and adding the liquor therefrom to the said aqueous extract, concentrating this solution, treating the concentrate separately with solvents and with a cocain removing agent to remove the cocain and other alkaloidal bases.

6. The process of preparing an extract of coca leaves which consists in steam distilling the leaves, leading off the distillate, boiling the leaves in water, expressing the leaves and adding the liquor therefrom to the aqueous extract obtained by boiling, concentrating the solution, treating the concentrate with solvents to remove ecgonin and benzoyl ecgonin and with a cocain removing agent, concentrating the final solution and adding the original distillate to the concentrate.

7. The process of preparing an extract of coca leaves which comprises boiling the leaves in water, concentrating the resulting aqueous extract, treating the concentrate with alcohol to remove part of the cocain and all of the ecgonin and benzoyl ecgonin, then treating the extract with an adsorbing agent to remove the remaining cocain.

8. The process of preparing an extract of coca leaves which comprises extracting the leaves with boiling water, concentrating the aqueous extract, treating the concentrated extract with alcohol to remove the ecgonin and benzoyl ecgonin and most of the cocain, then treating this solution with fullers' earth and filtering off the solution.

9. The process of preparing an extract of coca leaves which consists in steam distilling the leaves in their natural state, leading off the distillate, boiling the leaves in water, draining off the aqueous extract from the leaves, expressing the leaves to remove the remaining liquor, adding such liquor to said aqueous extract, concentrating said extract, treating the concentrated extract with alcohol to remove the ecgonin and benzoyl ecgonin and most of the cocain, dissolving in water the part of the extract not dissolved in the alcohol, and treating the solution with fullers' earth, filtering off the solution from the fullers' earth, concentrating the extract thus obtained and adding thereto the original distillate.

In witness whereof, we have hereunto set our hands and seals at Indianapolis, Indiana, this 31st day of January, A. D., nineteen hundred and seventeen.

FRANK R. ELDRED.
FRANCIS E. BIBBINS. [L. S.]
RAY N. REED. [L. S.]

Witnesses:
E. G. EBERHARDT,
A. L. WALTERS.

Copies of this patent may be obtained for five cents each, by addressing the "Commissioner of Patents, Washington, D. C."